United States Patent Office 3,235,614
Patented Feb. 15, 1966

3,235,614
PROCESS FOR THE PRODUCTION OF
EXO-DICYCLOPENTADIENE
Henry E. Fritz, South Charleston, David W. Peck, Charleston, and Marion A. Eccles, Nitro, W. Va., assignors to Union Carbide Corporation, a corporation of New York
No Drawing. Filed July 18, 1961, Ser. No. 124,792
8 Claims. (Cl. 260—666)

This invention relates to a novel process for the production of exo-dicyclopentadiene.

Dicyclopentadiene is a starting material for the manufacture of highly useful epoxy polymers. To produce these polymers, dicyclopentadiene is oxidized to form a diepoxide which, in turn, is polymerized under suitable conditions. A major disadvantage of using the commercially available form of dicyclopentadiene, the endo isomer, for this purpose is the high melting point of the diepoxide produced (185° C.) This high melting point necessitates handling of the diepoxide as a solid and presents difficult problems to the epoxide formulator and thus has resulted in limiting the commercial utility of this compound. However, the diepoxide derived from exo-dicyclopentadiene has a substantially lower melting point, i.e., below 60° C., than the pure endo-diepoxide and diepoxides derived from mixtures of endo- and exo-dicyclopentadiene are easier to handle and provide a greater degree of flexibility in preparing epoxide formulations than pure endo-diepoxide. Hence there has been a need for a commercially attractive process for the manufacture of exo-dicyclopentadiene.

In the past, efforts to produce exo-dicyclopentadiene have met with little success. Attempts to synthesize the exo-isomer by low-temperature dimerization of cyclopentadiene have led to substantially quantitative yields of the endo-isomer, while operating at high temperatures has resulted in extensive polymer formation. Alternatively, it has been proposed to convert the endo-isomer to the exo-isomer. It has been found that by heating endo-dicyclopentadiene to 150° C. for about twenty hours, a 7-8% yield of exo-dicyclopentadiene can be obtained. Clearly, such a yield is to low for commercial application. Another known method to convert the endo-isomer to the exo-isomer involves reacting endo-dicyclopentadiene with hydriodic acid to form iodo-dihydro-exo-dicyclopentadiene which, in turn, is reacted with potassium hydroxide to give exo-dicyclopentadiene, potassium iodide and water. Although higher yields can be obtained by this process, the complexity of the steps involved and the large quantities of chemicals required render the synthesis unsuitable for large-scale production.

It has now been found that, by proceeding according to the method of the present invention, superior yields of exo-dicyclopentadiene may be obtained from a starting material selected from the group consisting of endo-dicyclopentadiene and cyclopentadiene by a simple, efficient, and economic process. The process of this invention requires relatively short reaction times and avoids the consumption of large quantities of additional chemicals.

Basically, the process of this invention involves an essentially liquid-phase thermal conversion of the starting material, either endo-dicyclopentadiene or cyclopentadiene, employing an inert organic solvent.

The term "inert organic solvent" as used herein refers to organic solvents in which both cyclopentadiene and dicyclopentadiene are soluble, which are stable under the reaction conditions and inert to the components of the reaction mixture, and which behave as liquids under the reaction conditions employed.

Illustrative of the inert organic solvents that may be used in carrying out the present invention are, for example, aliphatic and cycloaliphatic hydrocarbons, aliphatic and cycloaliphatic alcohols, aromatic hydrocarbons, chlorinated hydrocarbons, ethers, ketones, esters, amines, amides, glycols, polyethers, hydroxypolyethers, sulfur containing compounds such as tetrahydrothiophene 1,1-dioxide, carbon disulfide, and the like, and inert mixtures thereof.

More specifically, as exemplary of the inert organic solvents that can be used in accordance with this invention, there may be mentioned aliphatic hydrocarbons having from about 5 to about 20 carbon atoms, such as pentane, hexane, heptane, octane, decane, hexadecane, eicosane and isomers thereof; aliphatic alcohols having from 1 to about 16 carbon atoms, such as methanol, ethanol, n-propanol, isopropanol, butanol, tertiary butanol, pentanol, decanol, and the like; single-ring aromatic hydrocarbons having from zero to six alkyl side chains, each of such side chains containing from 1 to 12 carbon atoms, but where the total number of carbon atoms in the side chains is less than 15, such as benzene, toluene, xylene, ethylbenzene, diethylbenzene, triethylbenzene, isopropylbenzene, diisopropylbenzene, butylbenzene, and the like; multi-ring aromatic hydrocarbons having from 11 to 20 carbon atoms and including from zero to eight alkyl side chains, each of such side chains containing from one to 12 carbon atoms, such as diphenyl, methyldiphenyl, methyl naphthalene, ethyl naphthalene, diethyl naphthalene and the like; chlorinated hydrocarbons containing from 1 to 16 carbon atoms and from 1 to 6 chlorine atoms, such as chloroform, carbon tetrachloride, chloroethane, hexachloroethane, 2-ethylhexyl chloride, ethylene dichloride, chlorobenzene, and the like; cycloaliphatic hydrocarbons having from 5 to 20 carbon atoms and including from zero to six alkyl side chains containing nor more than 12 carbon atoms each, such as cyclopentane, methylcyclopentane, ethylcyclopentane, cyclohexane, methylcyclohexane, ethylcyclohexane, dimethylcyclohexane, diethylcyclohexane, triethylcyclohexane, diisopropylcyclohexane, and the like; nonaromatic condensed-ring hydrocarbons having from 8 to 20 carbon atoms and including from zero to eight alkyl side chains containing no more than 12 carbon atoms each, such as decalin, methyldecalin, ethyldecalin, dimethyldecalin, diethyldecalin, hexahydroindan, 4,7-methylenehexahydroindan, and the like; multi-ring hydroaromatic hydrocarbons having from 9 to 20 carbon atoms and including from 1 to 8 alkyl side chains containing no more than 12 carbon atoms each, such as indan, methylinda, tetralin, methyltetralin, dimethyltetralin, ethyltetralin, cyclohexylbenzene, and the like; cycloaliphatic alcohols containing from 1 to 16 carbon atoms, such as cyclopentanol, cyclohexanol, cycloheptanol, and the like; ethers containing from 4 to 20 carbon atoms, such as diethyl ether, diisopropyl ether, di-n-butyl ether, ethyl-isopropyl ether, didecyl ether, diphenyl ether, and the like; ketones containing from 3 to 16 carbon atoms, such as acetone, methylisobutylketone, and the like; esters containing from 3 to 16 carbon atoms, such as ethyl acetate, butyl acetate, methylbutyrate, and the like; amines containing from 3 to 16 carbon atoms, such as n-butylamine, triethylamine, and the like; amides containing from 3 to 16 carbon atoms, such as dimethylformamide, acetamide, and the like; glycols containing 2 to 10 carbon atoms, such as ethylene glycol, propylene glycol, pentanediol, decylene glycol, and the like; polyethers containing from 4 to 16 carbon atoms and from 2 to 6 oxygen atoms, such as bis(2-ethoxyethyl)ether, bis(2-butoxyethyl)ether, 1,2-dibutoxyethane, and the like; hydroxyethers and hydroxypolyethers containing from 3 to 16 carbon atoms and from 2 to 6 oxygen atoms, such as diethylene glycol, triethylene glycol, dipropylene glycol, 2-methoxyethanol, 2-butoxyethanol, 2(2-ethoxyethoxy)ethanol, 2-(2-methoxyethoxy)ethanol, 2(2-n-hexoxyethoxy)ethanol, and the like; tetrahydrothiophene 1,1-dioxide and its alkyl derivatives containing from 1 to 4 alkyl side chains having no more than 6 carbon atoms each and in which the total number of carbon atoms in the molecule is less than 13, such as methyltetrahydrothiophene 1,1-dioxide, ethyltetrahydrothiophene 1,1-dioxide, propyltetrahydrothiophene 1,1-dioxide, and the like; carbon disulfide; and inert mixtures of the above-listed solvents.

Solvents preferred because of their availability and low cost, and the ease with which they can be separated from the reaction mixture, include, for example, aliphatic hydrocarbons having from about 5 to about 10 carbon atoms, such as pentane, hexane, heptane, octane, nonane, and decane, isomers thereof, and inert mixtures thereof; aliphatic alcohols having from 1 to about 4 carbon atoms, such as methanol, ethanol, propanol, isopropanol, and butanol; and aromatic hydrocarbons such as benzene, toluene, o-, p-, and m-xylene, and o-, p-, and m-cresol, and the like. High-boiling aliphatic and aromatic solvents such as decanol, triethyl benzene, diphenyl, diphenyl ether, and the like and mixtures thereof, may also be economically employed.

Applicants' experiments have shown that the choice of the particular inert organic solvent employed has little or no effect on the efficacy of the process of this invention, provided that an essentially liquid phase reaction is maintained. The term "essentially liquid phase" as used herein is meant to refer not only to true liquid-phase reactions but also to reactions in which the inert organic solvent used in this invention is in the vapor state but where the operating pressure applied is sufficient to result in an inert organic solvent vapor density which approaches the density of the liquid inert organic solvent.

The process of this invention can be carried out at temperatures of from about 200° C. to about 350° C., but is preferably effected at temperatures between about 250° C. and 310° C. When operating below about 200° C., yields of exo-dicyclopentadiene are relatively low, i.e., the isomerization from the endo to the exo form proceeds slowly, whereas the use of temperatures higher than about 350° C. leads to in residue formation and reduced yields. Generally, the optimum balance between residue formation and effective isomerization, which increase with increasing temperatures, is achieved between about 250° C. and about 310° C. at the preferred space velocities and residence times.

The pressure at which the reaction can be carried out can vary broadly. Preferred is a pressure range of from about 50 to about 10,000 p.s.i.g., and more preferred is a pressure range from about 500 to about 5,000 p.s.i.g. As pointed out above, the choice of operating pressure depends primarily on the particular inert organic solvent used. Sufficient pressure is required to insure that the inert organic solvent behaves substantially as a liquid under the reaction conditions, i.e., that an essentially liquid phase reaction is maintained. It is to be noted, however, that the solvent need not actually *be* a liquid under the reaction conditions. For example, isopropanol, which has a critical temperature of about 235° C., may successfully be employed in the preferred operating temperature range of 250–310° C. by employing pressures which result in a solvent density approaching the density of liquid isopropanol. Isopropanol, from the point of view of solvency, behaves as a liquid under these conditions.

The mol ratio of solvent to starting material can range from about 1:1 to about 30:1, but is preferably between about 2.5:1 to about 20:1. At mol ratios below 1:1 extensive polymer residue formation takes place, resulting in reduced yields of the exo-isomer. The use of mol ratios greater than 30:1, while resulting in less polymer residue formation, also leads to reduced yields for exo-isomer.

The process of the present invention may be conducted continuously or in batch-wise fashion. When operating continuously, the space velocity, defined as liters of feed per liter of reactor volume per hour, may vary from about 0.5 to about 100, but is preferably between about 2 and about 65. Generally, when temperatures near the lower limit of the stated range are employed, low space velocities give better yields, while operating at temperatures near the upper limit of the stated range makes the use of high space velocities desirable. When carrying out the reaction batch-wise, the reaction time may vary from about two minutes to about five hours, and is preferably from about five minutes to about thirty minutes.

Although applicants do not rely on any particular theory for the success of their invention, their experiments demonstrate that both endo-dicyclopentadiene and cyclopentadiene can be successfully employed as starting materials. In addition, experiments have demonstrated that, in the conversion of the endo-to the exo-isomer, monomeric cyclopentadiene is found in the reaction mixture. This evidence supports the theory that the conversion of endo-to exo-isomer proceeds via the monomer according to the following equation:

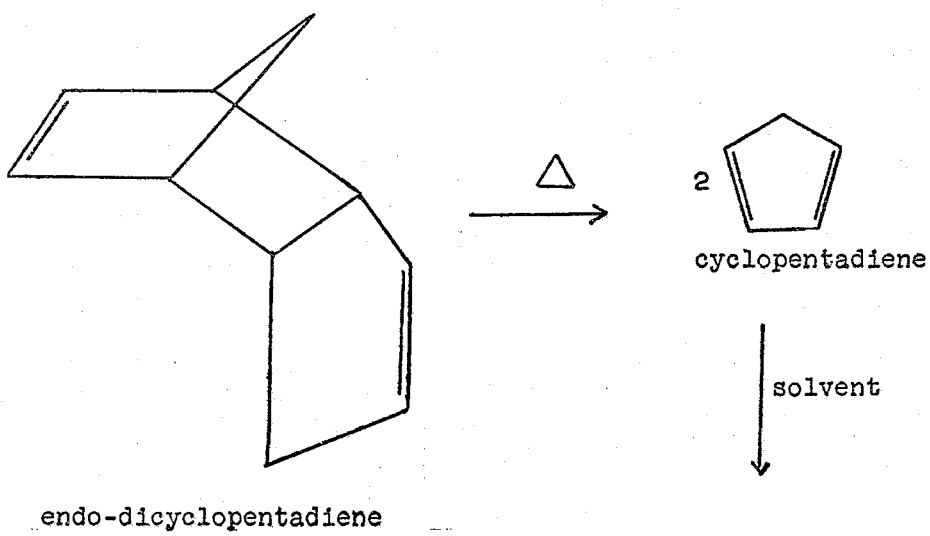

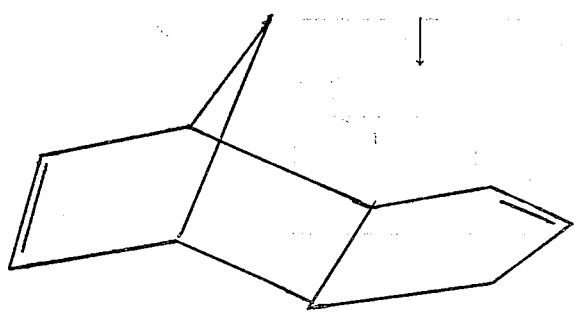

exo-dicyclopentadiene

Although both endo-dicyclopentadiene and cyclopentadiene may be successfully employed as starting materials, the availability, stability and ease of handling of endo-dicyclopentadiene make it the preferred starting material.

The mixture of exo-dicyclopentadiene and endo-dicyclopentadiene produced by the process of the present invention may be separated from the reaction mixture by means known in the art, e.g. by distillaiton or solvent extraction. For example, in separating the two dicyclopentadiene isomers by distillation, if the solvent used is lower-boiling than dicyclopentadiene, the solvent and cyclopentadiene monomer present in the reaction mixture may be distilled off at atmospheric pressure, followed by a reduced-pressure fractional distillation of both dicyclopentadiene isomers to leave a partially polymerized residue in the kettle. Alternatively, if the solvent used is higher-boiling than dicyclopentadiene, the entire distillation may be carried out under reduced pressure. Any cyclopentadiene monomer present in the reaction mixture will distill over first and may be caught in a cold trap, while the two dicyclopentadiene isomers are collected as the distillate. Remaining in the kettle will be the solvent, together with a partially polymerized residue. It is advantageous to employ a solvent having a higher boiling point than dicyclopentadiene in that, after separation of the dicyclopentadienes and the monomer, the solvent-residue mixture can be again usefully reacted. Experiments have shown that the residue partially depolymerizes to form diicyclopentadiene and cyclopentadiene. In a continuous process, the solvent-residue mixture may conveniently be recycled to the reactor.

The exo - dicyclopentadiene/endo - dicyclopentadiene mixtures obtained as described above may be used directly for epoxide production. Alternatively, if a higher exo-isomer content is desired, the mixtures obtained by the process of this invention can be enriched in exo-isomer by adding substantially pure exo-dicyclopentadiene, prepared by small-scale syntheses of nearly pure exo-dicyclopentadiene known to the art, to said mixtures. Such enriched mixtures can then be employed for epoxide production.

The following examples are illustrative. Examples 1–26 illustrate the use of endo-dicyclopentadiene as the starting material. Examples 27 and 28 illustrate the use of cyclopentadiene as the starting material.

Unless otherwise specified, Examples 1 to 25 were carried out in a coiled, high-pressure tubular reactor (stainless steel, eleven feet long, 0.187″ inside diameter) with a volume of sixty cubic centimeters. The reactor was provided with a feed inlet valve and a pressurized gas inlet valve and was connected to a one-liter receiving vessel having a purge valve. The reactor was immersed in a lead bath heated to the indicated temperature and maintained at substantially constant temperature throughout each run. Before each run, both reactor and receiving vessel were pressurized to the indicated pressure, by admitting an inert gas, such as hydrogen or nitrogen, through the pressurized gas inlet valve of the reactor. The liquid feed mixture, consisting of premixed endo-dicyclopentadiene and the indicated solvent, was then pumped through the feed inlet valve of the reactor, displacing the gas, which was slowly purged through the purge valve of the receiving vessel to maintain constant pressure. When the reactor was completely filled with liquid, a stand-by pressurized receiving vessel was substituted for the vessel previously connected to the reactor and the run was started, the reactor product being collected in the receiving vessel. The reactor product was fractionally distilled to separate a dicyclopentadiene distillate, which was analyzed spectroscopically for its endo-isomer and exo-isomer content. Yields and efficiencies were then calculated. The structure of the exo-isomer was determined by infrared spectroscopy.

The solvents and operating conditions used and the results obtained are set forth in Table I, below.

TABLE I

| Example No. | Solvent | Solvent to endo,[a] mole ratio | Temperature, °C. | Pressure, p.s.i.g. | Space elocvity[d] | Exo[b] in DCPD[c] fraction, wt. percent | Overall Yield of exo,[b] wt. percent |
|---|---|---|---|---|---|---|---|
| 1 | Isopropanol | 22 | 330 | 4,000 | 17 | 37 | 12 |
| 2 | ----do---- | 20 | 310 | 4,000 | 16 | 46 | 22 |
| 3 | ----do---- | 20 | 290 | 4,000 | 17 | 52 | 22 |
| 4 | ----do---- | 20 | 270 | 4,000 | 17 | 47 | 22 |
| 5 | ----do---- | 21 | 250 | 4,000 | 17 | 25 | 16 |
| 6 | ----do---- | 20 | 290 | 4,000 | 34 | 48 | 23 |
| 7 | ----do---- | 20 | 290 | 4,000 | 34 | 52 | 24 |
| 8 | ----do---- | 20 | 290 | 4,000 | 34 | 44 | 22 |
| 9 | ----do---- | 20 | 290 | 2,000 | 34 | 40 | 21 |
| 10 | ----do---- | 20 | 290 | 4,000 | 68 | 38 | 18 |
| 11 | ----do---- | 20 | 290 | 4,000 | 34 | 48 | 23 |
| 12 | ----do---- | 20 | 250 | 4,000 | 17 | 25 | 14 |
| 13 [e] | ----do---- | 16 | 250 | 4,000 | 8 | 50 | 27 |
| 14 [e] | ----do---- | 19 | 250 | 4,000 | 4.7 | 54 | 25 |
| 15 [e] | ----do---- | 23 | 250 | 4,000 | 2.3 | 56 | 22 |
| 16 | ----do---- | 5 | 290 | 4,000 | 65 | 47 | 27 |
| 17 | ----do---- | 5 | 290 | 4,000 | 34 | 56 | 28 |
| 18 | ----do---- | 40 | 290 | 4,000 | 34 | 45 | 15 |
| 19 | ----do---- | 10 | 290 | 4,000 | 34 | 52 | 24 |
| 20 | ----do---- | 2.5 | 290 | 4,000 | 34 | 59 | 24 |

See footnotes at end of table.

TABLE 1—Continued

| Example No. | Solvent | Solvent to endo,[a] mole ratio | Temperature, °C. | Pressure, p.s.i.g. | Space velocity[d] | Exo[b] in DCPD[c] fraction, wt. percent | Overall Yield of exo[b], wt. percent |
|---|---|---|---|---|---|---|---|
| 21 | Isodecanol[f] | 12 | 250 | 4,000 | 8 | 50 | 30 |
| 22 | Hexane | 7 | 250 | 4,000 | 18 | 25 | 16 |
| 23 | Triethyl benzene | 5 | 290 | 4,000 | 34 | 58 | 30 |
| 24 | Dowtherm[g] | 12 | 250 | 4,000 | 8 | 50 | 30 |
| 25 | ...do... | 5 | 290 | 500 | 34 | 55 | 29 |

[a] Endo-dicyclopentadiene.
[b] Exo-dicyclopentadiene.
[c] Dicyclopentadiene (both isomers) fraction of reactor product.
[d] Liters of feed mixture per liter of reactor volume per hour.
[e] In examples 13, 14 and 15 the reactor volume was 350 cubic centimeters.
[f] A commercially available mixture of primary decyl alcohols ("Iso-Decanol", manufactured by Union Carbide Chemicals Company).
[g] The eutectic mixture of diphenyl and diphenyl ether.

Example 26

A mixture of 264 grams (2 moles) of endo-dicyclopentadine and 1320 grams (8.35 moles) of isodecanol was charged to a 3-liter rocker autoclave. The autoclave was heated, with rocking, to 230° C. The mixture was maintained at 230° C. for fifteen minutes and was then allowed to cool so that the total time above 200° C. was fifty minutes. The reaction mixture was distilled and a dicyclopentadiene fraction weighing 107 grams was separated. This fraction was analyzed spectroscopically and found to contain 41 percent endo-dicyclopentadiene and 59 percent exo-dicyclopentadiene, corresponding to an overall yield of exo-dicyclopentadiene of 24 percent.

Example 27

A mixture containing isopropanol and cyclopentadiene in a mol ratio of 11:1 (solvent to monomer) was continuously fed to the reactor as described for Examples 1–25. The reaction temperature was 290° C., the reaction pressure was 4000 p.s.i.g., and the space velocity was 17. The reaction mixture was fractionally distilled to separate a dicyclopentadiene distillate, which was analyzed spectroscopically and found to contain 52 percent exo-dicyclopentadiene, corresponding to an overall yield of exo-dicyclopentadiene of 21 percent.

Example 28

A mixture of 100 grams (1.52 moles) of cyclopentadiene and 1000 grams (16.7 moles) of ispropanol was charged to a 3-liter rocker autoclave. The mixture was heated, over a one-hour period, to 230° C., resulting in a pressure of 690 p.s.i.g. The mixture was maintained at 230° C. for 15 minutes and was then allowed to cool to 40° C. over a four-hour period, so that the total time above 200° C. was one hour. The reaction mixture was analyzed directly by infrared spectroscopy, without distillation, and found to contain 0.7 percent cyclopentadiene, 3.2 percent endo-dicyclopentadiene and 3.2 percent exo-dicyclopentadiene. Yield of exo-dicyclopentadiene was thus 35 percent, based on cyclopentadiene.

What is claimed is:

1. The process for producing exo-dicyclopentadiene which comprises maintaining at from 200° C. to 350° C. and at a pressure of from 50 to 10,000 p.s.i.g. an essentially liquid phase mixture containing (a) a starting material selected from the group consisting of endo-dicyclopentadiene and cyclopentadiene and (b) an inert organic solvent, in the substantial absence of other olefinic compounds.

2. The process for producing exo-dicyclopentadiene which comprises maintaining at from 250° C. to 310° C. and at a pressure of from 500 to 5,000 p.s.i.g. an essentially liquid phase mixture containing (a) a starting material selected from the group consisting of endo-dicyclopentadiene and cyclopentadiene and (b) an inert organic solvent, in the substantial absence of other olefinic compounds.

3. The process for producing exo-dicyclopentadiene which comprises maintaining at from 200° C. to 350° C. and at a pressure of from 500 to 5,000 p.s.i.g. and essentially liquid phase mixture containing endo-dicyclopentadiene and isopropanol, in the substantial absence of other olefinic compounds.

4. The process for producing exo-dicyclopentadiene which comprises maintaining at from 200° C. to 350° C. and at a pressure sufficient to maintain an essentially liquid phase reaction an essentially liquid phase mixture containing endo-dicyclopentadiene and decanol, in the substantial absence of other olefinic compounds.

5. The process for producing exo-dicyclopentadiene which comprises maintaining at from 200° C. to 350° C. and at a pressure sufficient to maintain an essentially liquid phase reaction an essentially liquid phase mixture containing endo-dicyclopentadiene and hexane, in the substantial absence of other olefinic compounds.

6. The process for producing exo-dicyclopentadiene which comprises maintaining at from 200° C. to 350° C. and at a pressure sufficient to maintain an essentially liquid phase reaction an essentially liquid phase mixture containing endo-dicyclopentadiene and triethyl benzene, in the substantial absence of other olefinic compounds.

7. The process for producing exo-dicyclopentadiene which comprises maintaining at from 200° C. to 350° C. and at a pressure sufficient to maintain an essentially liquid phase reaction an essentially liquid phase mixture containing endo-dicyclopentadiene and a mixture of diphenyl and diphenyl ether, in the substantial absence of other olefinic compounds.

8. The process for producing exo-dicyclopentadiene which comprises maintaining at from 200° C. to 350° C. and at a pressure of from 500 to 5,000 p.s.i.g. an essentially liquid phase mixture containing cyclopentadiene and isopropanol, in the substantial absence of other olefinic compounds.

References Cited by the Examiner

UNITED STATES PATENTS

| | | | |
|---|---|---|---|
| 2,401,414 | 6/1946 | Doumani et al. | 260—666 |
| 2,453,044 | 11/1948 | Staff | 260—666 |
| 2,801,270 | 7/1957 | Nelson et al. | 260—666 |
| 2,831,904 | 4/1958 | Kreps | 260—666 |
| 3,007,978 | 11/1961 | Beach | 260—666 |

FOREIGN PATENTS

| | | |
|---|---|---|
| 1,022,219 | 1/1958 | Germany. |
| 766,370 | 1/1957 | Great Britain. |

OTHER REFERENCES

Alder et al.: Chemical Abstracts, vol. 29, page 2516 (1935).

DELBERT E. GANTZ, *Primary Examiner.*

ALPHONSO D. SULLIVAN, *Examiner.*